United States Patent [19]
Herz

[11] 3,958,613
[45] May 25, 1976

[54] TREE AND STUMP EXTRACTION

[75] Inventor: Alvin E. Herz, Nutley, N.J.

[73] Assignee: L. B. Foster Company, Pittsburgh, Pa.

[22] Filed: Sept. 9, 1974

[21] Appl. No.: 504,090

[52] U.S. Cl. .............................. 144/2 N; 254/132; 37/2 R; 144/34 A
[51] Int. Cl.² ........................................ A01G 23/06
[58] Field of Search ................... 37/2 R; 173/49; 144/2 N, 34 A, 34 B; 254/124, 132

[56] References Cited
UNITED STATES PATENTS

| | | | |
|---|---|---|---|
| 2,735,255 | 2/1956 | Harper et al. | 37/2 R |
| 3,110,477 | 11/1963 | Campbell | 37/2 R |
| 3,433,311 | 3/1969 | LeBelle | 173/49 |
| 3,774,659 | 11/1973 | Bodine | 144/34 A |

FOREIGN PATENTS OR APPLICATIONS

| | | | |
|---|---|---|---|
| 262,538 | 5/1970 | U.S.S.R. | 37/2 R |
| 247,695 | 4/1969 | U.S.S.R. | 37/2 R |
| 645,198 | 9/1962 | Italy | 144/2 N |

Primary Examiner—Al Lawrence Smith
Assistant Examiner—James G. Smith
Attorney, Agent, or Firm—Buell, Blenko & Ziesenheim

[57] ABSTRACT

A method and apparatus are provided for recovering stump and root systems in timber harvesting by exerting a vertical lifting force combined with simultaneously vibrating the trunk of a tree or stump being harvested.

8 Claims, 7 Drawing Figures

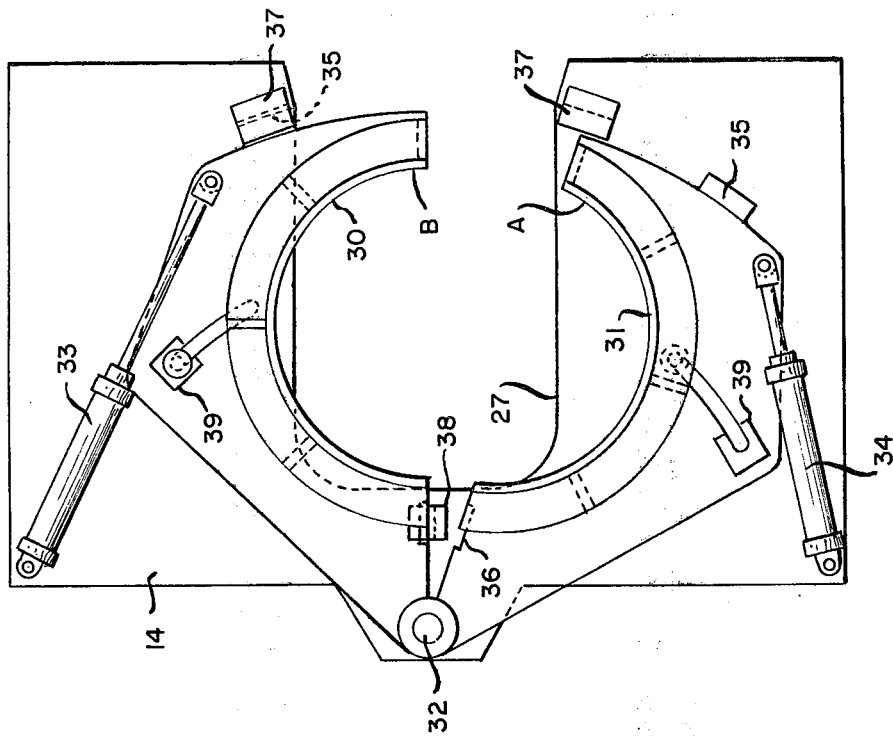
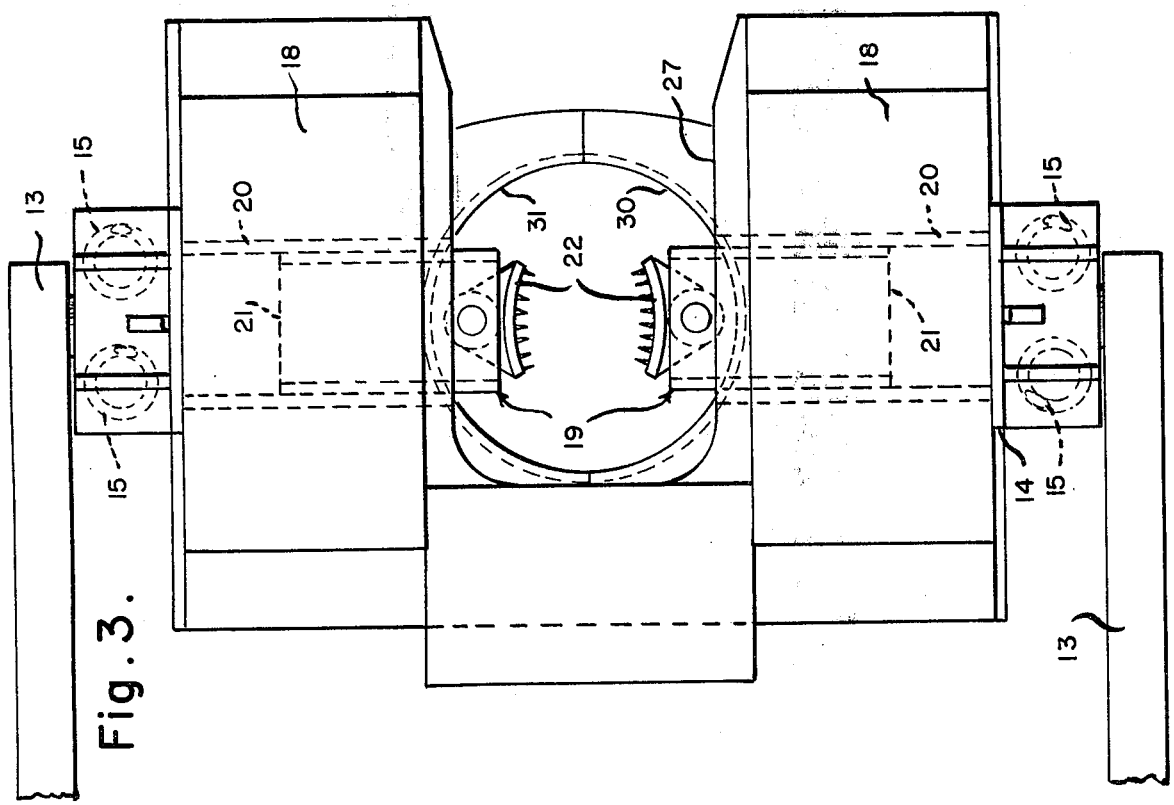

TREE AND STUMP EXTRACTION

This invention relates to tree and stump extraction and particularly to methods and apparatus for accomplishing extraction of trees.

It has become the practice over the years to cut trees at a point above the ground leaving a stump in the ground and to remove the trunk of the tree for the manufacture of lumber. At some subsequent date after the stump has partially decomposed it has been the practice to remove a part of the stump remaining and to use the heart wood of the stump for extraction of materials for explosive manufacture. It has been found, however, that this is a most uneconomical practice because something in excess of 20% of the total weight of wood fiber of each tree is to be found in the stump and root structure. This fiber, if it could be extracted and used before decomposition, would provide a very substantial source of wood fiber for the production of fiberboard and other related products. Heretofore, it has been the practice to bulldoze the stump out of the ground with consequential destruction of the entire surface of the area and upheaval of the whole surface of the area being bulldozed. It is, of course, desirable that the root removal be accomplished at the same time that the trunk is removed. In other words, that the entire trunk and root be removed simultaneously.

The present invention provides a method and apparatus for removing either the stump or the entire trunk and root system of a tree in a single operation.

In my invention I provide a mobile power source, a clamp means extending from said power source and adapted to engage the stump or the trunk of a tree. Vibratory means on said clamp means adapted to vibrate the trunk and root system of the tree while in the clamp and lift means lifting the clamp simultaneously with the vibration to extract the trunk and root system from the earth while being vibrated. In a modification of my invention I also provide a vertically movable shear on said mobile unit adapted to enter the earth and to sever the roots at a point spaced from the trunk of the tree. Preferably the vibratory unit is either hydraulically or electrically driven by a cam operated system which is affixed to the clamping means and suspended from the mobile unit. Preferably the vertically moving shear is also attached to said vibratory unit introducing vibratory motion into the shear as it moves in the vertical direction. Alternatively, the shearing may be accomplished by a rotary cutter moving about the trunk downwardly through the earth or by torque shearing of the trunk by twisting the trunk and root system to break the roots.

In the foregoing general description I have set out certain objects, purposes and advantages of this invention. Other objects, purposes and advantages of this invention will be apparent from a consideration of the following description and the accompanying drawings in which:

FIG. 3 is a top plan view of the apparatus of FIG. 2;

FIG. 5 is a bottom plan view of the apparatus of FIG. 2 showing one half of the root cutter in open position;

Figure 1:
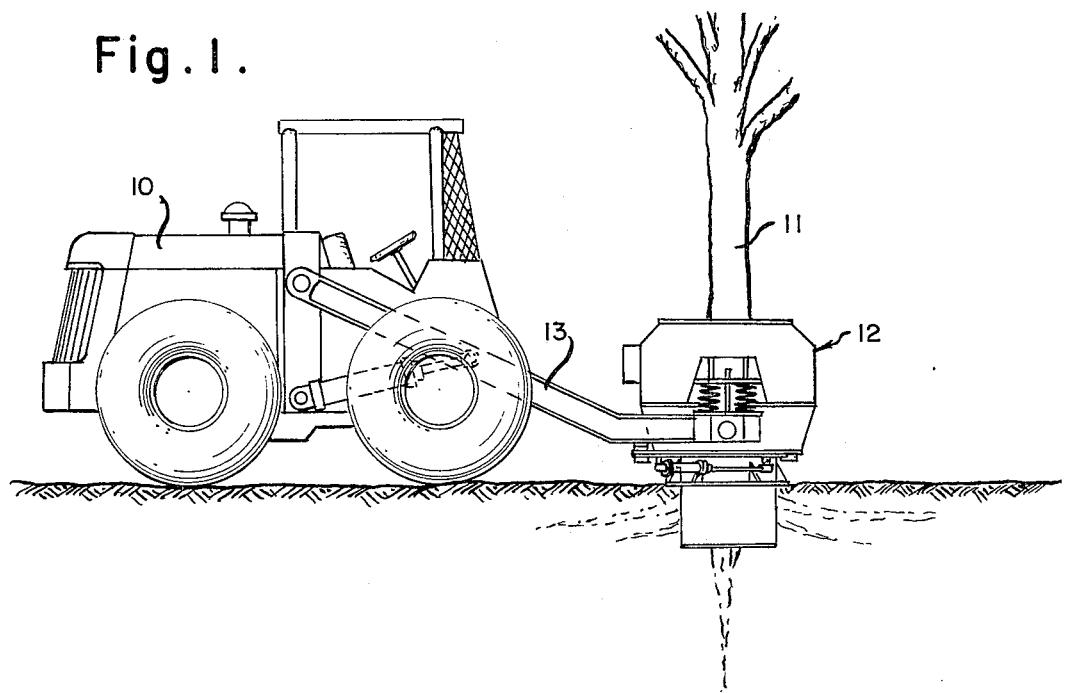
FIG. 1 is a side elevational view of an apparatus embodying the subject matter of this invention.
Figure 2:
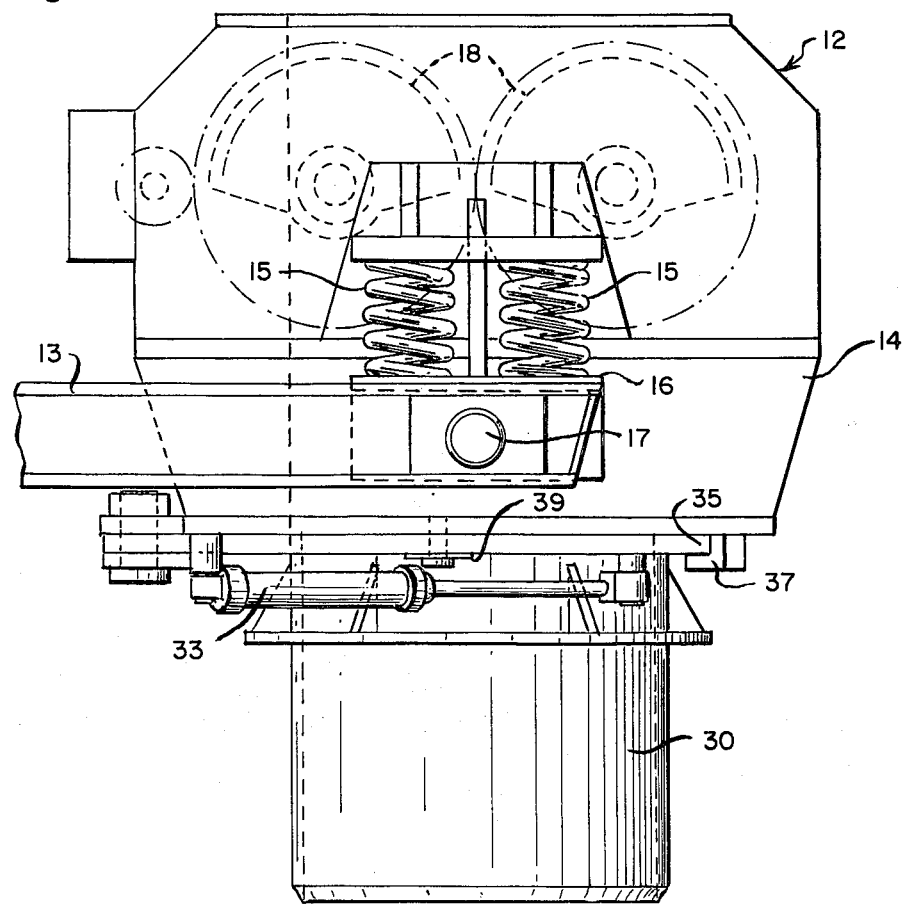
FIG. 2 is an enlarged side elevational view of a tree or stump extractor according to this invention.
Figure 6:
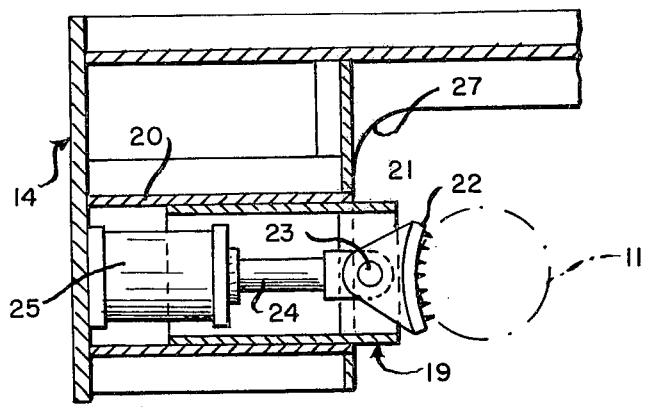
FIG. 6 is a fragmented horizontal section of the trunk clamp of the apparatus of FIG. 2.
Figure 7:
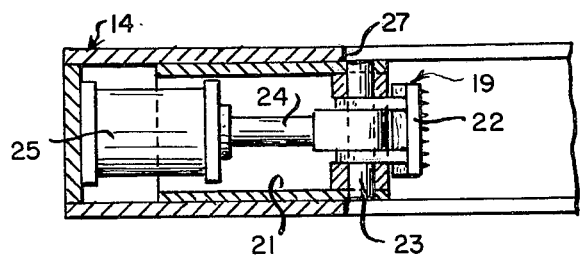
FIG. 7 is a fragmentary section on the line VII—VII of FIG. 6.
Figure 4:
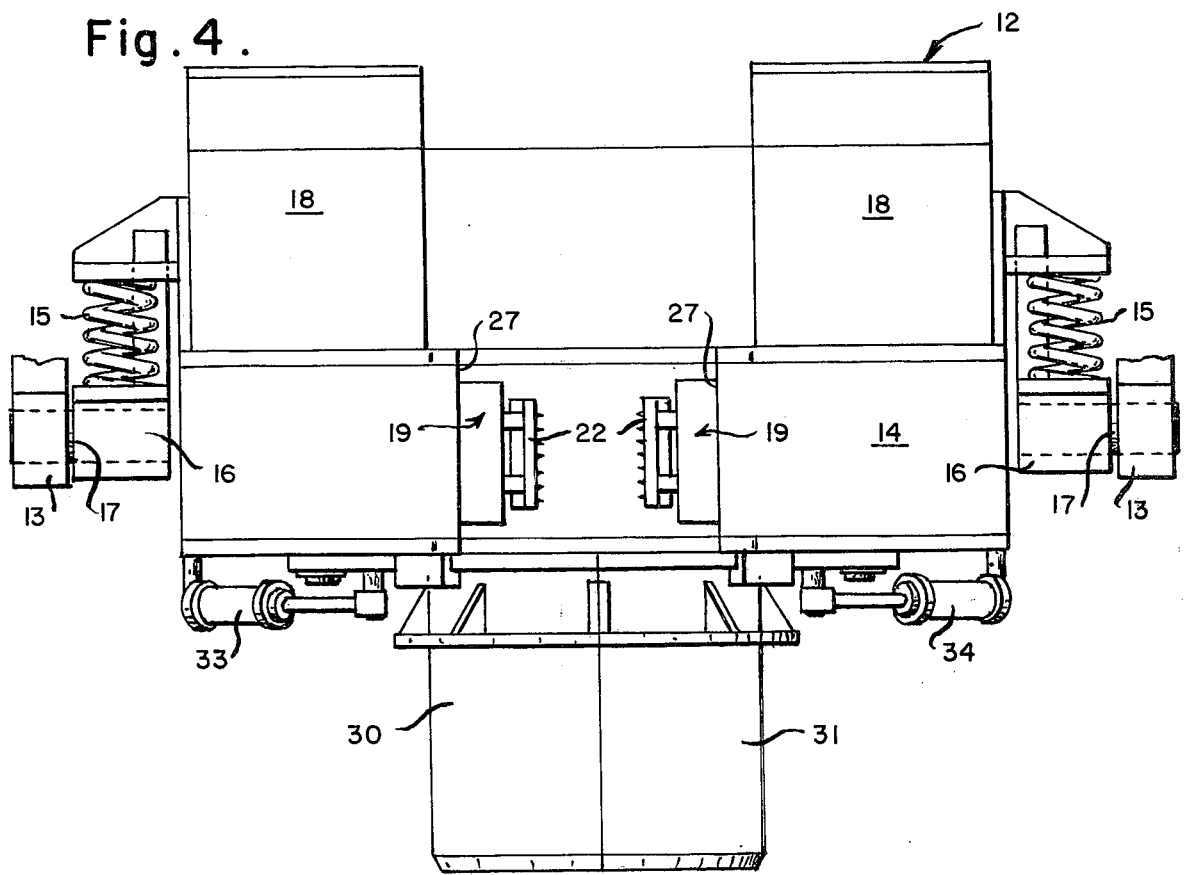
FIG. 4 is a front elevational view of the apparatus of FIG. 2.

Referring to the drawngs I have illustrated a mobile unit 10 which may be moved to a position adjacent to a tree trunk 11 to be removed. An extractor unit 12 is mounted on the front of unit 10 by a pair of lift arms 13 and is adapted to surround and engage the trunk 11. The extractor unit is made up of a frame 14 mounted on springs 15 carried by bolster 16 pivoted in arms 13 by shaft 17. The frame 14 carries vibratory mechanism 18 and clamp 19. The vibratory mechanism 18 is preferably of the type illustrated in U.S. Pat. Nos. 3,368,632; 3,433,311 and 3,564,932.

The clamp 19 is made up of a pair of telescoping box members 20 and 21. Member 20 is fixed to frame 14 and member 21 telescopes within member 20. A trunk extractor clamp member 22 is pivoted on pin 23 in the end of member 21 which is in turn connected to piston 24 of operating cylinder 25 which moves the box members 20 and 21 relative to one another and engages the clamp 22 against a tree trunk to be extracted.

A pair of semi cylindrical root cutters 30 and 31 are pivoted on pin 32 on frame 14 below clamp 19. The root cutters 30 and 31 are rotated about pin 32 on frame 14 by hydraulic cylinders and pistons 33 and 34 from an open position A, which permits the tree trunk to enter into the throat 27 of frame 14, to a closed position B in which the cutters surround the trunk. Each of the root cutters 30 and 31 are provided with shoulders 35 and 36 which engage ramps 37 and 38 on the frame to draw the cutters into tight engagement with said frame and with intermediate ramps 39 which aid in the same result.

In operation the mobile unit is moved to a position adjacent the tree. The extractor unit 12 is engaged about the trunk of the tree at a point above the ground. If it is not desired to cut the roots prior to extraction, then piston 24 is energized to engage clamp members 22 on opposite sides of the trunk 11. The vibratory unit 18 is energized causing the trunk 11 and whole root system to vibrate deep into the earth at the same time vertical pressure is applied from the lift arms 13 causing the trunk to be vertically raised out of the earth along with the entire root system. At the same time as the vertical movement on the tree raises the trunk and root system, the vibratory motion causes the earth normally attached to the lateral root system to be shaken free so that when the roots are removed the root system is clean of earth and stones. When the trunk and root system are free, the clamp 12 may be rotated about the axis of lugs 16a and the trunk lowered onto a carrier. Alternatively the clamp can be opened and a hydraulic kicker (not shown) energized to throw or push the tree away from the mobile unit.

In the event it is desired to shear the roots prior to extraction, then pistons 33 and 34 are energized to close cylinders 30 and 31 and the vibratory unit 18 is energized which forces the shear cylinders 30 and 31 vertically downward into the earth and through the lateral roots at a point spaced from the trunk. Since it is generally true that the lateral root system of most timber ordinarily does not extend more than about 18 to 20 inches below the earth's surface, the shear need only move that distance into the earth. This may, of course, vary depending on the type of soil as well as the type of tree and the shear may be adapted to such varying conditions. When the shear has been forced vertically downwardly and withdrawn then piston 24 is energized to engage clamp member 22 on the trunk 11 and then the vibratory unit 18 is energized and the trunk 11 and tap root and those portions of the lateral roots which remain on the stump are removed from the earth as described above.

Various other forms of lateral root cutters might be employed. For example, a rotary cylindrical root cutter might be dependently mounted on the frame, or a hydraulically operated vertically operated root cutter might be used, all within the concept of this invention.

While I have illustrated and described certain presently preferred practices and embodiments of my invention in the foregoing specification, it will be obvious that this invention may be otherwise embodied within the scope of the following claims.

I claim:

1. A method of tree and stump extraction comprising the steps of engaging the trunk of said tree and stump with a clamp means, exerting a vertical lifting force on the trunk of said tree and stump to be extracted through said engaging clamp means and simultaneously with exerting said vertical lifting force imparting, separate from the lift force, vibratory motion directly to said clamp means and thus to said trunk during extraction.

2. A method as claimed in claim 1 wherein lateral roots of the tree and stump are sheared at a spaced point from the axis of the tree and stump prior to exerting the lifting force and vibratory motion to the tree.

3. A method as claimed in claim 2 wherein the lateral roots of the tree and stump are sheared in a circle around the axis of the tree.

4. An apparatus for removing trees and stumps together with at least a portion of the root system comprising a mobile power source, clamp means extending from said power source and adapted to engage the trunk of a tree or stump to be removed, vibratory means directly attached only to said clamp to vibrate said tree or stump while in said clamp and lift means on the power source acting on said clamp lifting the clamp simultaneously with vibration of the clamp simultaneously to lift and vibrate during extraction.

5. An apparatus as claimed in claim 4 wherein the vibratory means is hydraulic eccentric weight actuated.

6. An apparatus as claimed in claim 4 wherein vertically movable shear means is provided on said clamp for shearing lateral roots.

7. An apparatus as claimed in claim 6 wherein the shear is vibratorily driven.

8. An apparatus as claimed in claim 6 wherein the shear is rotated about the axis of the tree or stump being extracted.

* * * * *